US006932227B1

(12) United States Patent
Glenn

(10) Patent No.: US 6,932,227 B1
(45) Date of Patent: Aug. 23, 2005

(54) LAUNDRY STAND

(75) Inventor: James L. Glenn, St. Albans, MO (US)

(73) Assignee: Whitney Design, Inc., Bridgeton, MO (US)

( * ) Notice: Subject to any disclaimer, the term of this patent is extended or adjusted under 35 U.S.C. 154(b) by 0 days.

(21) Appl. No.: 10/824,112

(22) Filed: Apr. 14, 2004

(51) Int. Cl.[7] ............................................. A47B 43/00
(52) U.S. Cl. ...................... 211/202; 248/150; 248/165; 248/166; 403/400; 403/408.1
(58) Field of Search ................................ 248/150, 165, 248/166, 277.1; 211/200, 202; 403/161, 403/162, 297, 400, 408.1

(56) References Cited

U.S. PATENT DOCUMENTS

| | | |
|---|---|---|
| 719,186 A | 1/1903 | Champ |
| 1,533,470 A | 4/1925 | Schmitt |
| RE16,324 E | 4/1926 | Schmitt |
| 1,594,415 A * | 8/1926 | Kalgren ...................... 211/202 |
| 2,706,829 A | 4/1955 | Charnin |
| 3,551,963 A * | 1/1971 | Mosher, Jr. et al. .......... 24/618 |
| 4,131,205 A | 12/1978 | Malecki |
| 4,236,542 A | 12/1980 | Fishburn |
| 4,518,089 A | 5/1985 | Campbell |
| 4,609,317 A * | 9/1986 | Dixon et al. ................. 411/339 |
| 4,675,937 A | 6/1987 | Mitomi |
| 4,722,634 A | 2/1988 | Malish |
| 4,726,705 A * | 2/1988 | Gomes ........................ 403/292 |
| 4,828,123 A * | 5/1989 | Basore ....................... 211/202 |
| 5,098,214 A | 3/1992 | Solano et al. |
| 5,375,938 A | 12/1994 | Bartlow |
| 5,586,483 A | 12/1996 | Sine |
| 5,651,631 A | 7/1997 | Carmien |
| 6,045,291 A | 4/2000 | Ruchle et al. |
| 6,095,475 A | 8/2000 | Willms et al. |
| 6,238,127 B1 | 5/2001 | Jhumra et al. |
| 6,283,314 B1 | 9/2001 | Loguercio |
| 6,371,313 B1 | 4/2002 | Walter et al. |
| 6,394,292 B1 | 5/2002 | Sabounjian |
| 6,427,858 B2 | 8/2002 | Sabounjian |
| 2004/0173553 A1 * | 9/2004 | Li .............................. 211/202 |

FOREIGN PATENT DOCUMENTS

AU 133642 * 7/1949 ................. 211/202

* cited by examiner

Primary Examiner—Jonathon Szumny
(74) Attorney, Agent, or Firm—Polster, Lieder, Woodruff & Lucchesi, L.C.

(57) ABSTRACT

A laundry stand having a plurality of sleeve connectors, a plurality of elongated members, and plurality of crossrods with end connectors thereon. The sleeve connectors include an enlarged head portion, a hollow body portion defining a central bore, and a end portion having a greater diameter than the hollow body portion. The sleeve connector further defines a slot in the tail portion for allowing the end portion to resiliently deflect inwardly to fit within a bore of a diameter substantially equal to the diameter of the hollow body portion. The sleeve connectors each also include an inwardly formed resilient tab used to maintain end connectors within the sleeve connector.

31 Claims, 5 Drawing Sheets

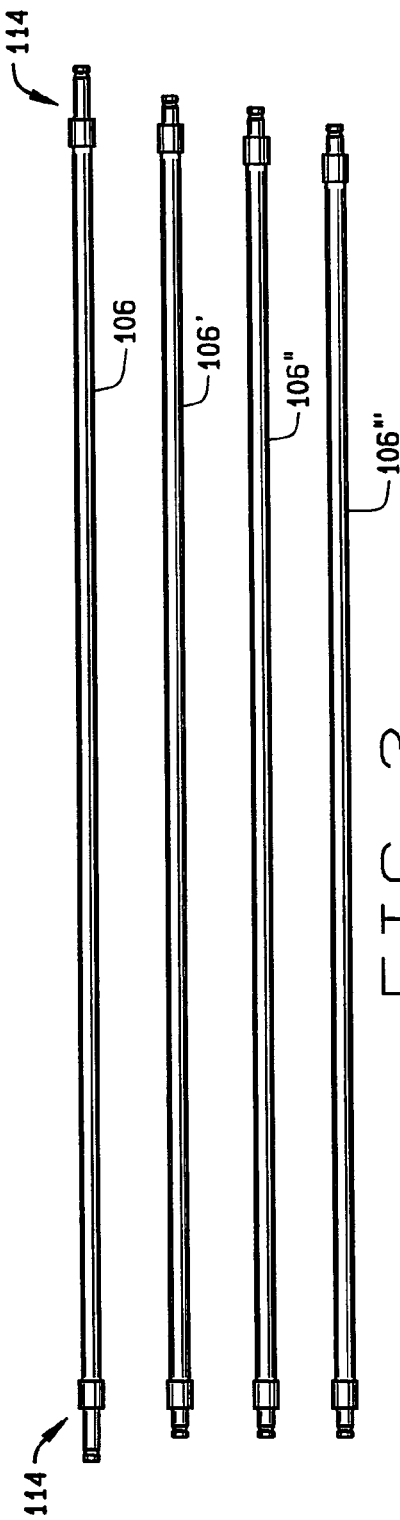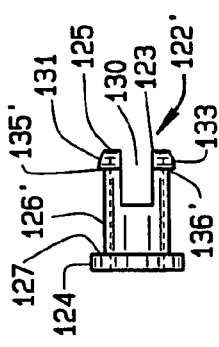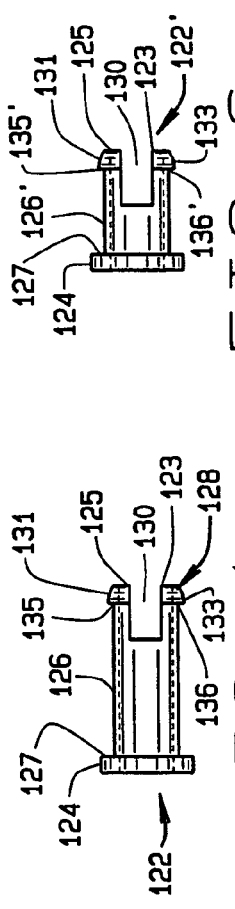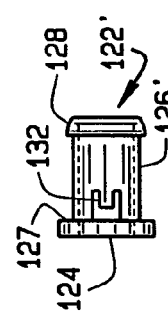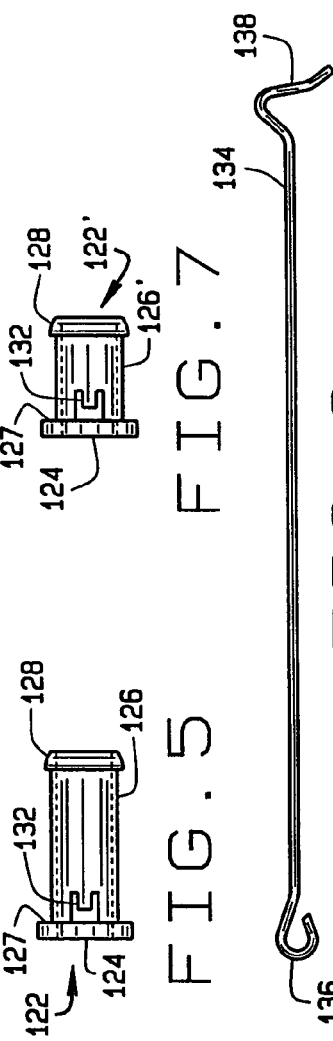

LAUNDRY STAND

BACKGROUND OF THE INVENTION

A. Field of the Invention

The invention relates to the field of laundry stands. More specifically, the invention relates to laundry stands that are collapsible for storage when not in use.

B. Description of Related Art

Other attempts at collapsible laundry stands have been made in the past. For example, U.S. Pat. No. 1,594,415 shows a plurality of cross bars 9 attached to folding frames 6, 7, 8 on either side of the cross bars 9. The cross bars 9 are maintained within the folding frames 6, 7, 8 by stamped metals sleeves 12 having a slit therein. The sleeves 12 also comprise an inwardly pressed knob 13 that cooperates with a groove 11 in the cross bar 9 to maintain the cross bar 9 within the sleeve 12. The sleeve 12 further comprises flanged ends which maintain the sleeve 12 within bores of the folding frames 6, 7, 8. The sleeve 12 is inserted into each bore by compressing the sleeve 12 to the point where one of the flanged ends can pass through the folding frames 6, 7, 8. However, at least one of the flanged ends must be formed after the sleeve has been inserted into the frames 6, 7, 8.

U.S. Reissued Pat. No. Re. 16,324 discloses a drying rack in which slats 3 are attached to one another by sleeves 4. Each sleeve 4 comprises a spring 12 and is maintained within aligned bores of the slats 3 by flanges 6, 7. The spring 12 prevents removal of a rod 8 that has been inserted within the sleeve 4 by cooperating with a groove 9 of the rod 8. The sleeves 4 are inserted into the bores of the slats by inserting the sleeve 4 having only one flanged formed thereon and forming the second flange after the sleeve 4 has been inserted through the bore. As with the '415 patent, at least one of the flanged ends must be formed after the sleeve has been inserted into the slats.

More recently, U.S. Pat. No. 6,394,292 discloses three basic arrangements for attaching cross rods 16 to end frames of a laundry stand. At FIGS. 4–8, an arrangement is shown utilizing a connector 50 and fastener 74 to attach elongated members 26, 28 (forming an end frame) wherein the connector comprises an end 54 with a locking protrusion 62 that cooperates with a recess 64 of the cross rods 16. At FIGS. 9–13, a similar arrangement is shown wherein the cross rod 16 comprises the protuberance 56 and the connector 80 comprises a bore 86 with a recess 57.

At FIGS. 14–17 of the '292 patent, a connector 110 includes a body 112 with a generally cylindrical configuration. Longitudinally extending from one end of the body 112 is a pair of legs 114 and 116 which are separated by a gap 118. The outer surfaces of the legs 114 and 116 are cylindrical and generally aligned with the outer surface of the body 112. Extending radially outwardly from each of the legs 114 and 116 are projections 120 and 122, respectively, which are sized and configured to be inserted into holes or recesses 124 and 126 in the end 58 of the rod 16. Longitudinally extending from the other end of the body 112 is a shaft 128 with a disk 130 mounted to the end of the shaft. The shaft 128 and disk 130 are configured to fit into the U-shaped cut-out section 44 and the end of cross bar 38 so that the cross bar can be attached the leg 12 or 14. FIGS. 18–21 show variation of the FIGS. 14–17. However, the connectors of the '292 patent require too many separate parts to be efficiently manufactured.

SUMMARY OF THE INVENTION

The present invention comprises a laundry stand having a plurality of sleeve connectors, a plurality of elongated members, and plurality of crossrods with end connectors thereon. Pairs of elongated members define aligned bores through which a sleeve connector is inserted to pivotally connect the pair of elongated members to form a plurality of scissor linkages. At least one end of each of the elongated members define corresponding bores through which the sleeve connectors are inserted to join two scissor linkages to form a first end frame. At least two scissor linkages are joinable to form a second end frame. Each of the sleeve connectors have an enlarged head portion, a hollow body portion defining a central bore, and a end portion having a greater diameter than the hollow body portion. Each sleeve connector further defines a slot in the end portion that allows the end portion to resiliently deflect inwardly such that the end portion has a reduced diameter substantially equal to the diameter of the hollow body portion when inwardly deflected. The sleeve connectors each comprise an inwardly formed resilient tab. The crossrods comprise two end connectors formed or attached on either end of the crossrod. Each end connector comprises an enlarged portion, an extension portion and an abutment member. The end connector further defines a groove and an engagement surface upon the abutment member. When the end connector is inserted into the central bore of the sleeve connector, the inwardly formed resilient tab contacts the engagement surface of the abutment member to prevent removal of the crossrod from the sleeve connector.

BRIEF DESCRIPTION OF THE DRAWINGS

FIG. 3 is a side view of crossrods according to a preferred embodiment of the present invention;

FIG. 4 is a side view of a sleeve connector according to a preferred embodiment of the present invention;

FIG. 5 is a view of the sleeve connector of FIG. 4 rotated ninety degrees;

FIG. 6 is a side view of a shortened sleeve connector according to a preferred embodiment of the present invention;

FIG. 7 is a view of the sleeve connector of FIG. 6 rotated ninety degrees;

FIG. 8 is a side view of a stiffness rod according to a preferred embodiment of the present invention;

DESCRIPTION OF THE PREFERRED EMBODIMENT

Figure 1:
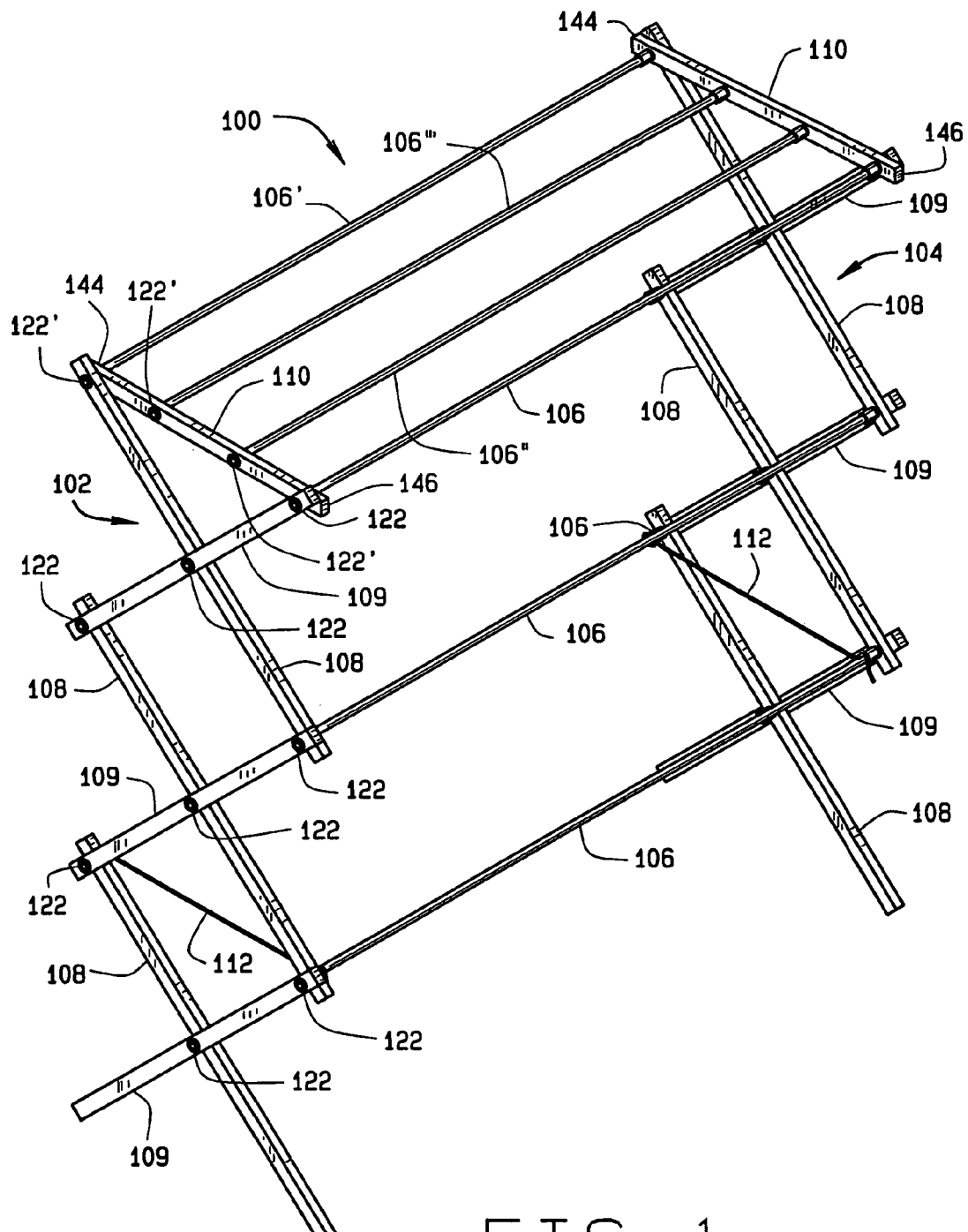
FIG. 1 is a perspective view of a laundry stand according to a preferred embodiment of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
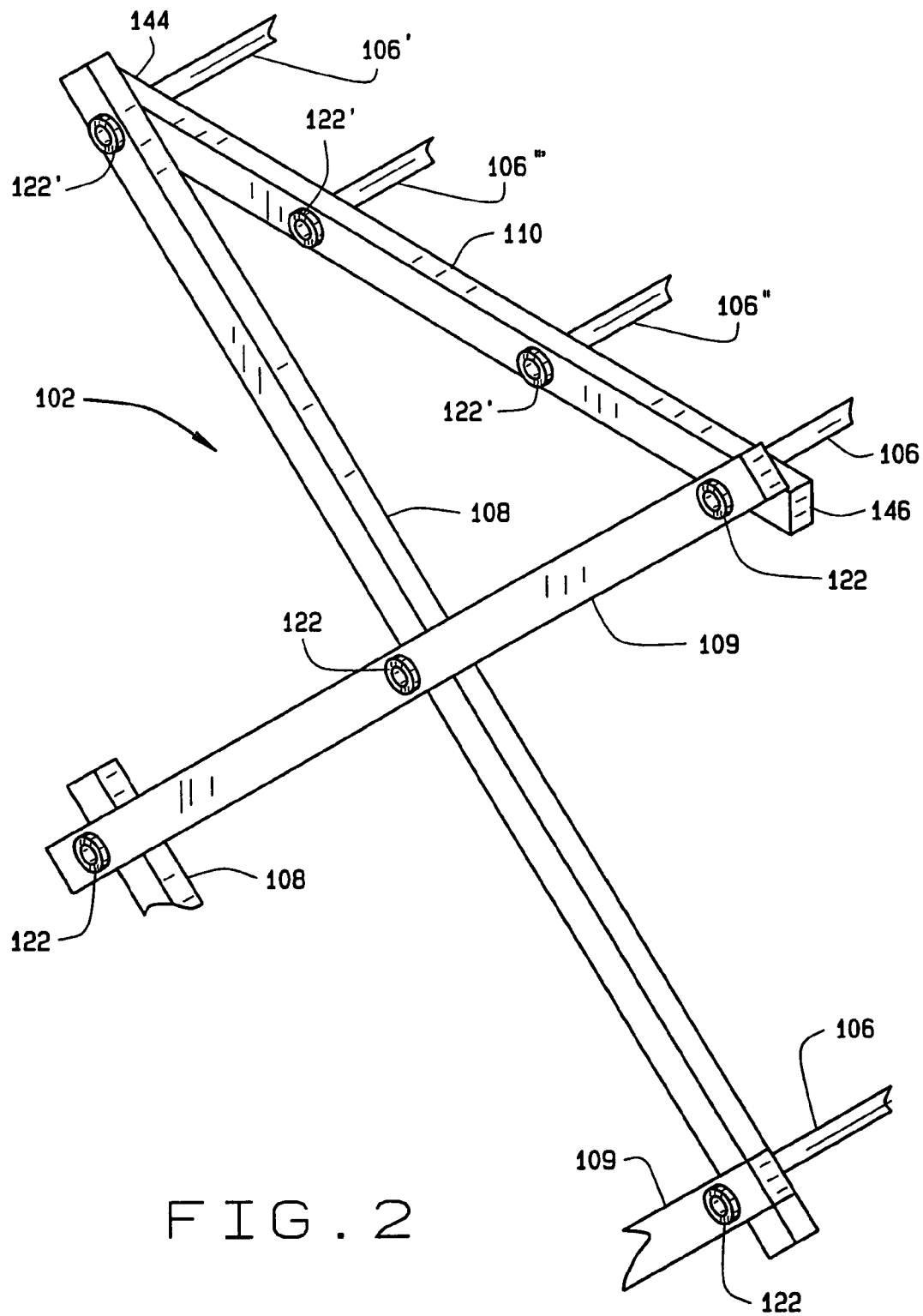
FIG. 2 is an enlarged, partial perspective view of an end frame, crossrods and bar according to a preferred embodiment of the present invention.

Referring to FIGS. 1 and 2, there is shown a laundry stand 100 according to the present invention. The laundry stand 100 comprises first and second end frames 102, 104 and a plurality of crossrods 106, 106', 106", 106'". The end frames 102 each comprise interior elongated members 108 and exterior elongated members 109 that are attached to one another and to the crossrods 106 by connectors (described below). The elongated members 108, 109 are preferably made from a hollow extruded polymeric material, but may be made from any other material, such as wood, and may be hollow or solid without departing from the scope of the present invention. Attaching ends of the uppermost elongated members 108, 109 are a pair of bars 110. Attaching the second lowermost two crossrods 106 are stiffness rods 112.

Figure 9A:
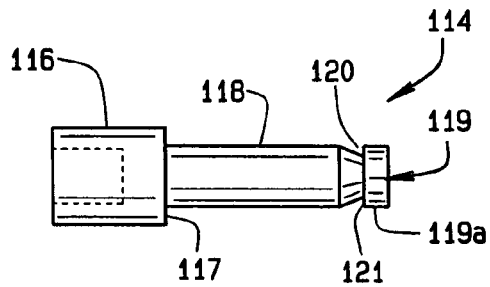
FIGS. 9A and 9B are side view of end connectors according to a preferred embodiment of the present invention.
Figure 9B:
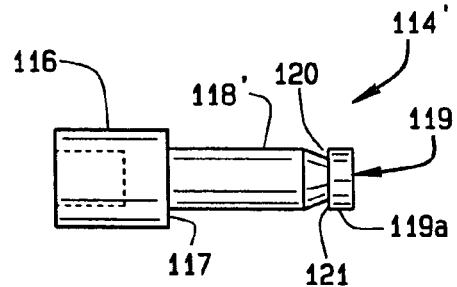

Referring to FIG. 3, the laundry stand 100 preferably comprises seven long crossrods 106, a second, shorter crossrod 106', a third, shorter crossrod 106", and a fourth, shortest crossrod 106'". The crossrods are preferably made from a hollow extruded polymeric material and may be reinforced with reinforcing rods placed within their hollow center. For purposes of cost it may be desirable to provide reinforcing rods in only some of the crossrods. However, the crossrods may be made from any other material, such as wood, and may be hollow or solid without departing from the scope of the present invention. The crossrods 106 each include end connectors 114 (FIGS. 9A & 9B) comprising an enlarged, hollow cylindrical portion 116, an extension portion 118, and an abutment member 119. The enlarged, hollow cylindrical portion 116 defines an annular engagement surface 117. The extension portion 118 has a tapered annular groove 120 toward its distal end and an annular engagement surface 121 forming a proximal edge surface of the abutment member 119. The abutment member 119 has an outer annular band-like surface 119a. Moreover the end connectors 114 are preferably molded to be a single unitary item. The crossrods 106', 106", 106'" each comprise end connectors 114' identical to end connectors 114 except that each connector 114' includes a shortened extension portion 118'.

With reference to FIGS. 4–7, the elongated members 108, 109 are attached to one another by sleeve connectors 122. Referring to FIGS. 4 and 5, a sleeve connector 122 comprises an enlarged head portion 124, a hollow body portion 126 and a tapered, enlarged end portion 128. The head portion 124 defines an annular head engagement surface 127, and the tapered, enlarged end portion 128 defines base engagement surfaces 123, 125. The end portion 128 and a portion of the body portion 126 define a pair of slots 130. The slots 130 divide the end portion 128 into two tails 131, 133 that are capable of resilient deflection toward one another. The enlarged end portion 128 has a proximal arcuate angular engagement surface which is divided into two tail surface sections 135, 136 by the slots 130. Tail surface section 135 corresponds to tail 131 while tail surface section 136 corresponds to tail 133. The body portion 126 also comprises one or more inwardly extending resilient tabs 132. The connector 122' of FIGS. 6 and 7 is similar in every respect to the connector 122 of FIGS. 4 and 5 except that the hollow body portion 126' of FIGS. 6 and 7 is shorter than the hollow body portion 126 of FIGS. 4 and 5. Preferably, the connectors 122 connectors are molded to be a single unitary item.

Referring to FIGS. 1 and 2, the end frames 102, 104 are constructed by attaching two elongated members 108, 109 at their centers with a connector 122 of FIGS. 3 and 4. Specifically, a sleeve connector 122 is pushed through aligned center holes of the elongated members 108, 109. As the sleeve connector 122 is pushed through the aligned center holes, the two tails 131, 133 are deflected inwardly to allow the connector 122 to enter the bore. After the end portion 128 exits the second elongated member 109, the tapered tails 131, 133 are resiliently urged outwardly to their original state so that the tail engagement surfaces 135, 136 abut an outer surface 148 (FIG. 10) of the member 109 and the head engagement surface 127 abuts an outer surface 148 of the member 108. In this manner, the sleeve connector 122 holds the two elongated members 108, 109 together while still allowing relative rotational movement of the elongated members 108, 109 about the connector 122. Next, two other pairs of elongated members 108, 109 are attached in like manner.

The three pairs of elongated members 108, 109 are attached at their ends by inserting connectors 122 through aligned bores adjacent the ends of the elongated members 108, 109 to form an end frame 102. End frame 104 is similarly constructed.

Referring to FIGS. 1, 2, 11 and 12, the bars 110 define three bores 140 and a slot 142. For clarity in FIGS. 1, 2, 11 and 12, the end of the bar 110 having the slot 142 is labeled with numeral 144 and the opposite end is labeled 146. The bars 110 are attached at end 146 to the end frames 102, 104 with an end connector 122. The end connectors 122 allow rotational movement of the bars 110 with respect to the end frames 102, 104. Next, the lowermost seven cross rods 106 are attached to sleeve connectors 122 by inserting the first end connector 114 of the crossrod 106 into a sleeve connector 122 of the end frame 102 and inserting the second end connector 114 of the crossrod 106 into a corresponding sleeve connector 122 of the end frame 104.

Figure 10:
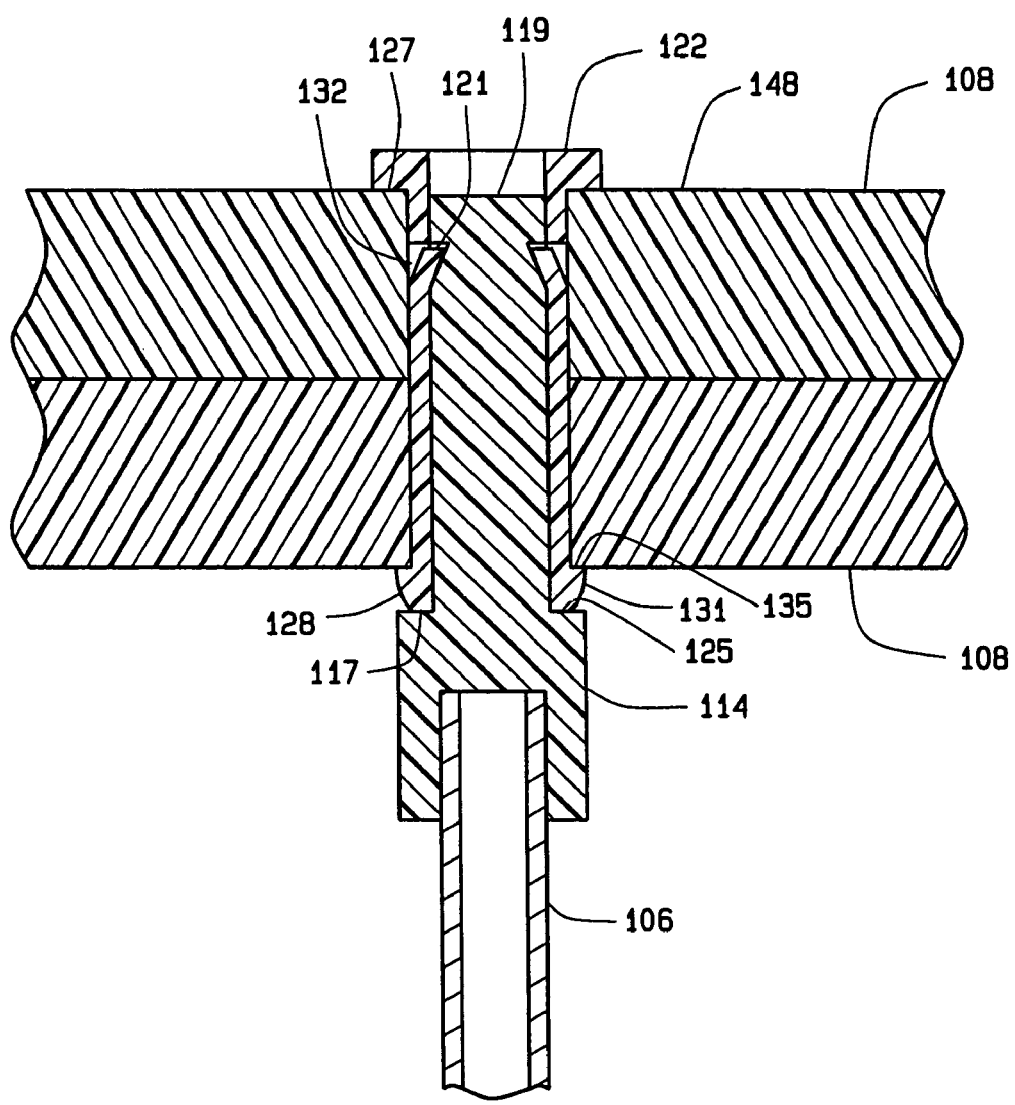
FIG. 10 is a section view of a sleeve connector attaching two elongated members with an end connector inserted therein according to a preferred embodiment of the present invention.

Referring to FIG. 10, when the end connector 114 is inserted into the sleeve connector 122, the resilient tab 132 is initially deflected outwardly by the abutment member 119 of the end connector 114. As the resilient tab 132 is deflected outwardly enough to allow passage of the abutment member 119, the resilient tab 132 abuts the annular surface 119a of abutment member 119. Next, after the abutment member 119 passes the resilient tab 132, the resilient tab 132 returns to its inwardly projecting position, as shown in FIG. 10, and within the annular groove 120. Additionally, when inserted as described into the sleeve connector 122, the annular engagement surface 117 abuts the base engagement surfaces 123, 125. The resilient tab 132, when within the annular groove 120, prevents removal of the end connector 114 by contacting the engagement surface 121 thereby locking the end connector 114 within the sleeve connector 122.

Figure 11:
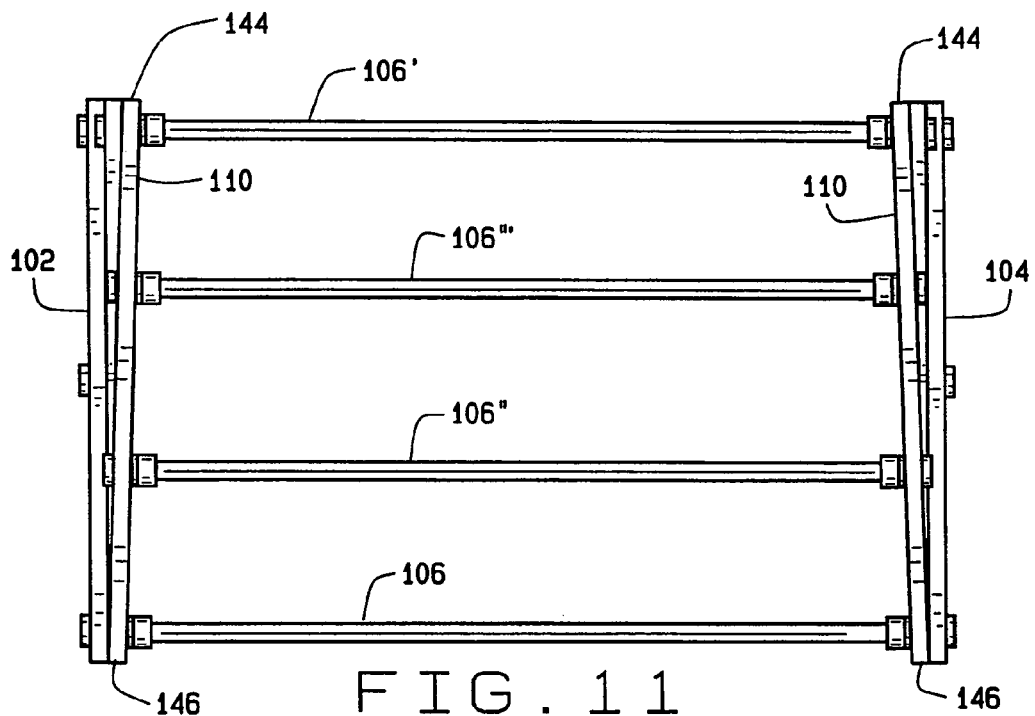
FIG. 11 is top view of the laundry stand of FIG. 1.
Figure 12:
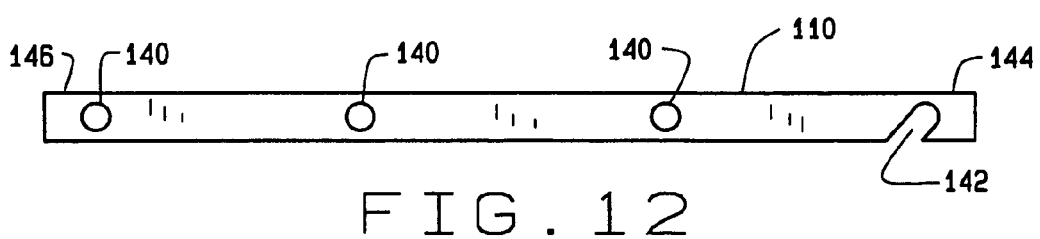
FIG. 12 is a side view of a bar according to a preferred embodiment of the present invention.

Referring to FIG. 2, shortened end connectors 122' are installed within the center two bores 140 of the bar 110 and into the end frames 102, 104. Crossrods 106', 106", 106'" are then installed into the connectors 122' as shown in FIGS. 1 and 2, so that the bars 110 can be rotated such that the slots 142 of the bars 110 will accept the crossrod 106'. Referring to FIG. 11, the crossrods 106", 106'" are of decreasing sizes to cause the bars 110 to not be in parallel alignment. As a result, the ends 144 of the bars 110 having the slots 142 are closer to one another than the ends 146 of the bars 110 with the bores 140. In this manner, the slots 142 are properly positioned to accept the crossrods 106' and do not interfere with the end frames 102, 104.

Preferably, to conserve shipping cost and merchandising space, the laundry stand 100 is provided to the end consumer with the end frames 102, 104 fully assembled with the end connectors 122, 122' and with the bars 110 attached to the end frames 102, 104, but with the crossrods 106, 106', 106", 106'" not installed. In this manner the end frames 102, 104 and the crossrods can be tightly packed into a smaller package that costs less to ship and requires less shelf space. When the end user completes assembly of the laundry rack 100, the end user need only insert the crossrods 106, 106', 106", 106'" (with the end connectors 114, 114' pre-attached) to the sleeve connectors 122, 122' by inserting the end connectors 114 into the hollow center of the sleeve connectors 122, 122'.

In some instances, it may be desirable to provide further stiffness to the laundry stand 100 depending upon the stiffness of the material selected for the elongated members 108, 109. To this end, there are provided the stiffening rods 112 (FIG. 8). The stiffening rods 112 are attached to two crossrods 106 to be therebetween, such as shown in FIG. 1. Each rod 112 comprises a first end 136 comprising an eye and a second end 138 comprising a hook. The first end 136 is attached over a rod before it is installed, and the second end 138 is removably attachable to the other crossrod 106.

Additionally, in order to assist end users in assembling the device, the sleeve connectors 122 and end connectors 114 can be color coded. This coding aids the end user in determining the appropriate crossrod 106, 106', 106", 106'" and end connector 114, 114' to insert into the appropriate sleeve connector 122, 122'.

By utilizing the above configuration, a collapsible drying rack can be economically provided to end users by providing it to them in a partially assembled configuration. Moreover, the consumer assembly process is easily performed by merely inserting the end connectors 114 in to the sleeve connectors 122. The end connectors and sleeve connectors are superior to the prior art because the end frames can be quickly assembled by the manufacturer using pre-molded sleeve connectors that comprise only a single unitary part requiring no further steps to be performed for assembly of the end frame after the connector has been inserted through the bore within each elongated member.

In view of the above, it will be seen that several advantages of the present invention have been achieved and other advantageous results have been obtained.

I claim:

1. A laundry stand comprising:
a plurality of pairs of elongated members, each pair of elongated members having aligned bores through which a sleeve connector is inserted to pivotally connect the pair of elongated members to form a plurality of scissor linkages, at least one end of each of the elongated members defining corresponding bores through which the sleeve connectors are inserted to join two scissor linkages to form a first end frame, and at least two scissor linkages being joinable to form a second end frame; each of the sleeve connectors having an enlarged head portion, a hollow body portion defining a central bore, and an end portion having a greater diameter than the hollow body portion, the sleeve connector further defining a slot in the end portion that allows the end portion to resiliently deflect inwardly to allow it to pass through the bore of an elongated member, the sleeve connectors each comprising an inwardly formed resilient tab; and
a plurality of crossrods comprising two end connectors formed or attached on either end of the crossrod, each end connector comprising an enlarged portion, an extension portion and an abutment member, the end connector further defines a groove and an engagement surface upon the abutment member, wherein when the end connector is inserted into the central bore of the sleeve connector, the inwardly formed resilient tab contacts the engagement surface of the abutment member to prevent removal of the crossrod from the sleeve connector.

2. The stand of claim 1 further comprising a bar configured to be pivotally connected to a distal end of each two elongated members of the first end frame.

3. The stand of claim 2 further comprising a second bar configured to be pivotally connected to a distal end of each two elongated members of the second end frame.

4. The stand of claim 3 wherein a crossrod is attached to each of the first and second bars.

5. The stand of claim 4 wherein a plurality of crossrods are attached to each of the first and second bars.

6. The stand of claim 5 wherein the crossrods attached to the first and second bars progressively decrease in length from a first end of the bars to another end of the bar such that the bars are not parallel to one another.

7. The stand of claim 5 wherein the crossrods attached to the first and second bars comprise end connectors on opposite ends thereof and sleeve connectors are inserted into bores of the bars and wherein the sleeve connectors of the crossrods are attached to the end connectors of the bars.

8. The stand of claim 2 wherein the bar defines a slot in an end thereof for accepting a crossrod that is attached to another distal end of the pair of elongated members forming the scissor linkage.

9. The stand of claim 1 further comprising a stiffness rod attached to two crossrods to minimize deflection of the laundry stand.

10. The stand of claim 1 wherein the crossrods have the end connectors integrally formed thereon.

11. The stand of claim 1 wherein the crossrods have the end connectors adhered thereto.

12. The stand of claim 1 wherein each end connector is a one-piece unitary part.

13. The stand of claim 1 wherein each sleeve connector is a one-piece unitary part.

14. The stand of claim 1 wherein each end connector is a one-piece unitary polymer molded part.

15. The stand of claim 1 wherein each sleeve connector is a one-piece unitary polymer molded part.

16. The laundry stand of claim 1 wherein each pair of elongated members comprises an interior member and an exterior member, the interior member having an interior surface; and wherein the slot in the sleeve connector divides the sleeve connector enlarged end portion and part of the hollow body into at least two tails, the enlarged end portion of each tail having an engagement surface so that when the enlarged end portion passes through the aligned bores of a pair of elongated members, the engagement surfaces of the tail abut the interior surface of the interior elongated member.

17. The laundry stand of claim 1 wherein the pair of elongated members comprises an interior member and an exterior member, the exterior member having an exterior surface and wherein the enlarged head portion of the sleeve connector has an engagement surface so that when the sleeve connector is inserted through the aligned bores of a pair of elongated members, the head engagement surface abuts the exterior surface of the exterior elongated member.

18. A laundry stand comprising:
a plurality of pairs of elongated members, each pair of elongated members having aligned bores through which a sleeve connector is inserted to pivotally connect the pair of elongated members to form a plurality of scissor linkages, at least one end of each of the elongated members having corresponding bores through which the sleeve connectors are inserted to join two scissor linkages to form a first end frame, and at least two scissor linkages being joinable to form a second end frame, each of the sleeve connectors having an enlarged head portion, a hollow body portion having a central bore, and an end portion having a greater diameter than the hollow body portion, the sleeve connector further defining a slot in the end portion that allows the end portion to resiliently deflect inwardly such that the end portion has a reduced diameter to allow it to pass through the bore of an elongated member, the sleeve connectors each comprising an inwardly formed resilient tab, the end connector being a one-piece unitary part;
a plurality of crossrods comprising two end connectors formed or attached on either end of the crossrod, each end connector comprising an enlarged portion, an extension portion and an abutment member, the end connector further defines a groove and an engagement surface upon the abutment member, wherein the sleeve connector is a one-piece unitary part and wherein when the end connector is inserted into the central bore of the sleeve connector, the inwardly formed resilient tab contacts the engagement surface of the abutment member to prevent removal of the crossrod from the sleeve connector;
wherein the pair of elongated members comprises an interior member and an exterior member, the interior member having an interior surface and the exterior member having an exterior surface; and
wherein the slot in the sleeve connector divides the sleeve connector enlarged end portion and part of the hollow body into at least two tails, the enlarged end portion of each tail having an engagement surface so that when the enlarged end portion passes through the aligned bores of a pair of elongated members, the engagement surfaces of the tail abut the interior surface of the interior elongated member and the head engagement surface abuts the exterior surface of the exterior elongated member.

19. The stand of claim 18 further comprising a bar configured to be pivotally connected to a distal end of each of two elongated members of the first end frame.

20. The stand of claim 19 further comprising a second bar configured to be pivotally connected to a distal end of each of two elongated members of the second end frame.

21. The stand of claim 20 wherein a crossrod is attached to each of the first and second bars.

22. The stand of claim 21 wherein a plurality of crossrods are attached to each of the first and second bars.

23. The stand of claim 22 wherein the crossrods attached to the first and second bars progressively decrease in length from a first end of the bars to another end of the bar such that the bars are not parallel to one another.

24. The stand of claim 22 wherein the crossrods attached to the first and second bars comprise end connectors on opposite ends thereof and sleeve connectors are inserted into bores of the bars and wherein the sleeve connectors of the crossrods are attached to the end connectors of the bars.

25. The stand of claim 19 wherein the bar defines a slot in an end thereof for accepting a crossrod that is attached to another distal end of the pair of elongated members forming the scissor linkage.

26. The stand of claim 18 further comprising a stiffness rod attached to two crossrods to minimize deflection of the laundry stand.

27. The stand of claim 18 wherein each crossrod has the end connectors integrally formed thereon.

28. The stand of claim 18 wherein each crossrod has the end connectors adhered thereto.

29. The stand of claim 18 wherein each end connector is a one-piece unitary polymer molded part.

30. The stand of claim 18 wherein each sleeve connector is a one-piece unitary polymer molded part.

31. A laundry stand comprising:
a plurality of pairs of elongated members, each pair of elongated members having aligned bores through which a sleeve connector is inserted to pivotally connect the pair of elongated members to form a plurality of scissor linkages, at least one end of each of the elongated members defining corresponding bores through which the sleeve connectors are inserted to join two scissor linkages to form a first end frame, and at least two scissor linkages being joinable to form a second end frame, each of the sleeve connectors having an enlarged head portion, a hollow body portion defining a central bore, and a end portion having a greater diameter than the hollow body portion, the sleeve connector further defining a slot in the end portion that allows the end portion to resiliently deflect inwardly such that the end portion has a reduced diameter substantially equal to the diameter of the hollow body portion, the sleeve connectors each comprising an inwardly formed resilient tab, wherein the end connector is a one-piece unitary part;
a plurality of crossrods comprising two end connectors formed or attached on either end of the crossrod, each end connector comprising an enlarged portion, an extension portion and an abutment member, the end connector further defines a groove and an engagement surface upon the abutment member, wherein the sleeve connector is a one-piece unitary part and wherein when the end connector is inserted into the central bore of the sleeve connector, the inwardly formed resilient tab contacts the engagement surface of the abutment member to prevent removal of the crossrod from the sleeve connector;
a first bar configured to be pivotally connected to a distal end of each of two elongated members of the first end frame;
a second bar configured to be pivotally connected to a distal end of each of two elongated members of the second end frame, and wherein the bar defines a slot in an end thereof for accepting a crossrod attached to another distal end of the pair of elongated members forming the scissor linkage;
wherein a plurality of crossrods are attached to each of the first and second bars and the crossrods attached to the first and second bars progressively decrease in length from a first end of the bars to another end of the bar such that the bars are not parallel to one another;
wherein the pairs of elongated members comprise an interior member and an exterior member, the exterior member having an exterior surface and wherein the enlarged head portion of the sleeve connector has an engagement surface so that when the sleeve connector is inserted through the aligned bores of a pair of elongated members, the head engagement surface abuts the exterior surface of the exterior elongated member; and wherein the slot in the sleeve connector divides the sleeve connector enlarged end portion and part of the hollow body into at least two tails, the enlarged end portion of each tail having an engagement surface so that when the enlarged end portion passes through the aligned bores of a pair of elongated members, the engagement surfaces of the tail abut the interior surface of the interior elongated member.

* * * * *